(12) United States Patent
Benesi

(10) Patent No.: US 6,521,135 B1
(45) Date of Patent: Feb. 18, 2003

(54) FILTRATION APPARATUS OPERATION FEATURES

(76) Inventor: Steve C. Benesi, 611 Mc Clay Rd., Novato, CA (US) 94947

(*) Notice: Subject to any disclaimer, the term of this patent is extended or adjusted under 35 U.S.C. 154(b) by 0 days.

(21) Appl. No.: 09/487,060

(22) Filed: Jan. 19, 2000

Related U.S. Application Data

(60) Provisional application No. 60/116,413, filed on Jan. 19, 1999.

(51) Int. Cl.$^7$ .................... B01D 37/00; B01D 25/127
(52) U.S. Cl. .................. 210/771; 210/772; 210/808; 210/225; 210/227
(58) Field of Search ................ 210/767, 456, 210/768, 770, 771, 772, 797, 798, 783, 808, 225, 227

(56) References Cited

U.S. PATENT DOCUMENTS

| | | |
|---|---|---|
| 4,664,813 A * | 5/1987 | Schneider .................. 210/771 |
| 5,059,318 A | 10/1991 | Benesi |
| 5,133,879 A * | 7/1992 | Tiittanen .................... 210/770 |
| 5,292,434 A | 3/1994 | Benesi |
| 5,462,677 A | 10/1995 | Benesi |
| 5,477,891 A | 12/1995 | Benesi |
| 5,510,025 A | 4/1996 | Benesi |
| 5,573,667 A | 11/1996 | Benesi |
| 5,615,713 A | 4/1997 | Benesi |

* cited by examiner

*Primary Examiner*—Robert J. Popovics
(74) *Attorney, Agent, or Firm*—George W. Wasson; Mark Blumenkrantz

(57) ABSTRACT

A pressure-filter apparatus includes at least one filtration chamber coupled with a source of slurry. The filtration chamber is also coupled with a source of fluid at an elevated pressure, which may be arranged in series or in parallel with a source of wash fluid. The pressure-filter apparatus may also include a source of fluid at a conventional pressure.

15 Claims, 3 Drawing Sheets

FILTRATION APPARATUS OPERATION FEATURES

CROSS-REFERENCE TO RELATED APPLICATIONS

This application claims the benefit of U.S. Provisional Application No. 60/116,413 filed Jan. 19, 1999.

STATEMENT REGARDING FEDERALLY-SPONSORED RESEARCH OR DEVELOPMENT

Not applicable

REFERENCE TO MICROFICHE APPENDIX

Not applicable

BACKGROUND OF THE INVENTION

This invention relates to a filter apparatus and method of its operation, particularly to a pressure filter and method for extracting liquids from slurry fluids and for producing a substantially-dry filter cake of the solid materials present in such slurry fluids.

In many industrial processes and other applications where a slurry of solids and liquids is produced, it becomes necessary to filter the slurry solids from the liquids so that these materials may be efficiently utilized or, alternatively, disposed in an environmentally-safe manner. To separate the solids from the liquids, a filter apparatus, such as a pressure filter, is often employed. Known pressure filters may include one or more pairs of filter plates capable of relative motion. As an example, in a pressure filter having only a single pair of plates, the inlet plate is generally adapted for receiving the slurry, while the filtered liquids, called the filtrate, are collected by means of the outlet plate, which also provides the requisite support for a filter medium, positioned between the filter plates. This arrangement permits a filtration chamber to be defined by the inlet plate and the filter medium when the plates are pressed together. In the usual production cycle of such a filter, slurry is introduced into the filtration chamber under pressure through an inlet port, whereby it distributes itself throughout the chamber. After the filtration chamber is filled with slurry, the filter executes a series of programmed operations, namely, washing the contents of the chamber in a particular manner, as well as pressurizing the chamber, e.g., with compressed air, to force the liquids from the slurry through the filter medium, leaving the slurry solids, consolidated in a substantially-dry filter cake, within the chamber. The slurry liquids are collected and are either used or disposed in an appropriate manner. The chamber is then opened, allowing the filter cake to be removed therefrom.

Known pressure filters are capable of successfully treating a wide variety of slurries. However, the use of such filters has shown to be impractical for filtering certain difficult-to-filter slurries, such as certain modified starch, pigment, and molybdenum sulfide slurries. These slurries have proven to be difficult to filter, either because they contain fine particles, e.g., fines on the order of 0.5–10 microns, or because they include compressible solids. In either case, the filter cake being formed in a filtration chamber of a conventional pressure filter may become virtually impermeable to liquids being forced through the slurry solids using gases under commercially-available pressures on the order of 100 psi. As a result, the time required to produce a substantially-dry filter cake for these types of difficult-to-filter slurries drastically increases, making it impractical to use known pressure filters for treating such slurries. One solution may be to increase the pressure of the gas(es) used to force the liquids from the forming filter cake. However, this alternative proves to be cost-prohibitive because it requires the use of additional equipment and a substantial amount of energy to continuously maintain large quantities of compressed gas at the requisite high pressure.

Thus, a need arises for a pressure-filter apparatus capable of efficiently treating difficult-to-filter slurries, such as the types of slurries described above.

It is also desirable to provide a pressure-filter apparatus that is energy-efficient and is capable of extracting the slurry liquids to produce a substantially-dry filter cake in a minimum amount of time.

SUMMARY OF THE INVENTION

A pressure filter apparatus utilizing high-pressure fluid is disclosed. The filter apparatus includes at least one filtration chamber, a source of slurry coupled with the filtration chamber, and a source of fluid at an elevated pressure coupled with the filtration chamber.

The advantages of the invention will become apparent after consideration of the ensuing description and the accompanying drawings.

BRIEF DESCRIPTION OF THE DRAWINGS

The present invention is illustrated by way of example, and not by way of limitation, in the figures of the accompanying drawings, where.

For purposes of illustration, these figures are not necessarily drawn to scale. In all of the figures, like components are designated by like reference numerals.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described to avoid unnecessarily obscuring the invention. Accordingly, the specification and drawings are to be regarded in an illustrative, rather than a restrictive, sense.

Figure 1:
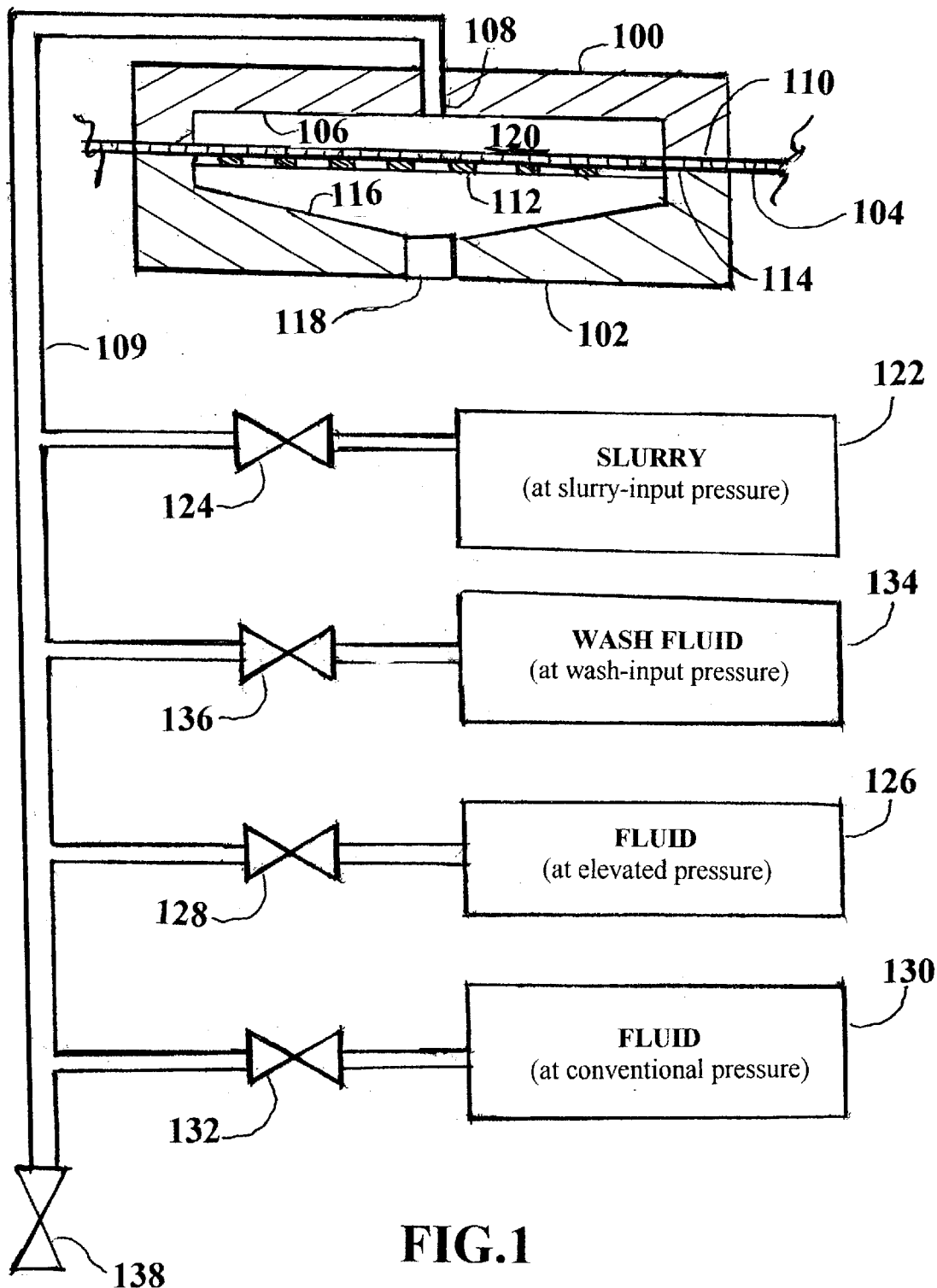
FIG. 1 is a schematic view of a pressure-filter apparatus according to one embodiment of the present invention.

FIG. 1 is a schematic view of a pressure-filter apparatus according to one embodiment of the present invention. The apparatus comprises an inlet plate 100 and an outlet plate 102, movable relative to each other, with a filter medium 104 capable of being disposed therebetween. Inlet plate 100 includes an inlet cavity 106 as well as an inlet port 108 in communication with cavity 106 and inlet piping 109. Inlet port 108 may be vertical, as shown in FIG. 1, or may be horizontally disposed (not shown). Inlet cavity 106 is bounded by a continuous mating surface 110. Outlet plate 102 incorporates a grid 112, which provides a supporting surface for filter medium 104. This supporting surface is bounded by and is substantially coplanar with (e.g., within approximately 1/16 of an inch) a continuous mating surface 114. Plate 102 further includes an outlet cavity 116 for collecting the filtrate liquids and an exit port 118 for discharging the filtrate, which may then undergo further processing or be properly disposed. The peripheral shape of plates 100 and 102 may take any form, but is usually rectangular or circular.

When plates 100 and 102 are pressed together, as illustrated in FIG. 1, a filtration chamber 120 is defined by inlet cavity 106 and filter medium 104. It should be understood that the longitudinal and transverse dimensions of the filter medium inside chamber 120 exceed the corresponding dimensions of inlet cavity 106. The depth of the filtration chamber may vary from about 0.25 of an inch to about 8 inches, depending on the particular application. An inlet distributor (not shown) may be disposed between inlet port 108 and cavity 106 to promote an optimal dispersion of slurry within the filtration chamber and to allow subsequent application of pressurized fluids without disturbing the uniform distribution of slurry inside the filtration chamber.

FIG. 1 provides only a schematic representation of the filter-plate configuration and certain elements of the apparatus either have not been shown or have been shown in simplified form to avoid unnecessarily obscuring the invention. For example, continuous mating surfaces 110 and 114 may contain recessed grooves having fluid connections for providing an effective seal between the mating surfaces of the filter plates to substantially reduce or completely eliminate leakage of slurry fluids between the filter plates. The specific details of such an arrangement are disclosed in U.S. Pat. No. 5,059,318 to the present inventor, which is hereby incorporated by reference. Similarly, grid 112 represents only one possible structure for providing the requisite supporting surface for filter medium 104. Other alternatives for supporting the filter medium, as well as specific arrangements and construction of the filter plates, the filter medium, and other components of the filter apparatus have been disclosed in U.S. Pat. Nos. 5,292,424, 5,462,677, 5,477,891, 5,510,025, 5,573,667, and 5,615,713 to the present inventor, all of which are hereby incorporated by reference. Even though inlet cavity 106 has been schematically illustrated in FIG. 1 as having square corners and vertical sidewalls, in practice it may be beneficial to provide an inlet cavity incorporating tapered sidewalls and radiused corners (not shown) to prevent the filter cake from adhering to the inside of inlet plate 100.

Referring to FIG. 1, the pressure-filter apparatus further includes a slurry source 122 coupled with inlet piping 109 via a shut-off valve 124. A fluid source 126, containing fluid at an elevated pressure, is coupled with inlet piping 109 by means of a shut-off valve 128. A fluid source 130 contains fluid at a conventional pressure and is coupled with the inlet piping via shut-off valve 132. Source 134 contains fluid at a wash-input pressure and is coupled with the inlet piping through shut-off valve 136. Inlet piping 109 also contains a purge valve 138. All sources discussed above, including sources 126 and 130, are arranged in parallel.

Sources 126 and 130 comprise holding tanks, the pressure in each of which is maintained by, e.g., at least one compressor of conventional design (not shown). Source 122 comprises a slurry-holding tank having at least one pressure-supply apparatus, such as a conventional pump (not shown). A wash-fluid source 134 may have a configuration similar to that of source 122 if it is designed to hold a liquid. Alternatively, it may be configured in a manner similar to sources 126 and 130 if its purpose is to hold a fluid such as pressurized steam.

Depending on the specific application, different combinations of fluids and pressures in the tanks are possible. For example, the slurry supplied from source 122 may be delivered to the filtration chamber at a slurry-input pressure from about 15 to about 125 psi. Similarly, source 126 may contain fluids at an elevated pressure from about 100 to about 400 psi and source 130 may contain fluids at a conventional pressure from about 30 to about 150 psi. Wash fluid in source 134 may be at a wash-input pressure from about 30 to about 200 psi. It should be noted that even though for many applications the relationship between the pressures is such that the slurry-input pressure will be the lowest, the elevated pressure the highest, and the conventional pressure will be higher than the wash-input pressure, this need not be true in all cases. In any particular situation, the only relationship between the above-mentioned pressures that must always be satisfied is that the elevated pressure of the fluid in source 126 must always be higher than the conventional pressure of the fluid in source 130. It is possible, for example, that in a specific application the slurry-input pressure of source 122 may exceed the elevated pressure of source 126. Similarly, the wash-input pressure of source 134 may be greater than the conventional pressure of source 130.

As mentioned above, sources 126 and 130 may contain a variety of different fluids, such as compressed air, nitrogen, $CO_2$, or steam. Source 134 may hold wash liquids such as water or may contain a fluid such as steam. Depending on the requirements for a particular application, sources 126 and 130 may incorporate the same or different fluids.

One salient feature of the present invention is that the volume of source 126, which contains fluid at elevated pressure, is considerably smaller than that of source 130, which contains fluid at conventional pressure. Thus, the volume of source 126 may be from about 0.04 ft$^3$ to about 2 ft$^3$ per square foot of filter area. By comparison, the volume of source 130 may be from about 2 ft$^3$ to about 10 ft$^3$ per square foot of filter area. The relatively small size of source 126 when compared to source 130 helps improve the energy efficiency of the filter apparatus, since less energy and equipment is required to generate high pressure in a small tank versus a large tank. Energy is further conserved because source 126 has to be pressurized only once per filtration cycle and useful work can be performed by the entire quantity of fluid contained therein. In other words, due to its high initial pressure, the fluid originating from source 126 need not be continuously maintained at the elevated pressure to be effective for the purpose of separating the slurry liquids from the solids. Conversely, the fluid in source 130 should be continuously maintained at conventional pressure to provide peak operating efficiency of the filter. However, because the fluid pressure in source 130 is much lower than that in source 126, it is relatively inexpensive to maintain pressure therein Moreover, just as with fluid at elevated pressure, once valve 132 is closed after the fluid at conventional pressure is supplied to chamber 120 from source 130, the entire quantity of released fluid is available for producing useful work of separating slurry liquids and solids.

Slurry source 122 may have a volume from about 0.01 ft$^3$ to about 1000 ft$^3$ per square foot of filter area, depending on several factors such as solids content and filterability of solids. Wash-fluid source 134 may have a volume from about 0.01 ft$^3$ to about 5 ft$^3$ per square foot of filter area, depending on wash or leaching requirements.

The filter apparatus described above may contain additional hardware and peripheral devices to enhance its operational capabilities. For example, sources 122, 126, 130, and 134 and their associated piping may include flow meters (not shown). Pressure sensors may be placed inside the filtration chamber and/or sources 122, 126, 130, and 134 to determine the pressure therein. A load cell (not shown) may be integrated into the assembly that incorporates plates 100 and 102 so that the weight of the contents of filtration chamber 120 may be ascertained. Conventional actuators (not shown) may be used to operate valves 124, 128, 132, 136, and 138, whose operation may be controlled, for example, in accordance with various timers (not shown). All of these devices may be electrically coupled with and controlled by a conventional electronic control unit (also not shown).

The method of operation of the above-described embodiment of the pressure-filter apparatus is discussed below with reference to FIG. 1. Initially, valve 124 is opened and a quantity of slurry at the slurry-input pressure is directed into filtration chamber 120 to be uniformly distributed therein. The inlet flow of slurry may be turned off based on elapsed time. Alternatively, the slurry supply may be shut off when the back pressure inside the chamber, measured by a pressure sensor (not shown), approaches the slurry-input pressure. Other conventional devices that may be used to ascertain when the flow of slurry into the chamber is to be terminated are a flow meter (not shown) and a load cell (also not shown). Thus, the flow of slurry into the chamber may be shut off when a flow meter, which measures the flow rate of slurry from source 122, indicates that the flow rate has decreased to a specified value. Similarly, where a load cell is utilized, slurry)will cease to be supplied into the filtration chamber when the contents of the chamber approach a specified weight.

After the closing of valve 124, inlet piping 109 may optionally be drained of slurry using purge valve 138. Next, valve 128 is opened and fluid (e.g., compressed air) at elevated pressure is introduced into the filtration chamber from source 126 to force the liquids from the cake forming in the filtration chamber. Once the liquids begin to clear the solids, valve 128 is closed to allow the falling residual pressure in the inlet piping and filtration chamber 120 to continue driving the liquids through the filtered solids. The shutoff point of valve 128 may be determined, e.g., by a pressure sensor located inside the filtration chamber or in the inlet piping. More specifically, when the pressure in the chamber begins to drop as the liquids start to clear the solids, the sensor provides an appropriate signal to the control unit, which in turn proceeds to close valve 128. Alternatively, the shut-off point of valve 128 may be based on elapsed time. The above sequence of operations results in a substantially-dry filter cake being produced in the filtration chamber and slurry liquids being collected in outlet cavity 116.

To produce a filter cake having an even lower liquid content, valve 132 may be opened for a specified time so that a fluid, such as compressed air, may enter the filtration chamber from source 132 at conventional pressure when the residual pressure in the filtration chamber drops sufficiently to be substantially equal to that conventional pressure.

Alternatively, if the washing of the contents of the filtration chamber is required, a cake-washing operation may be performed after the slurry has been distributed throughout the filtration chamber. In this instance, after the closing of valve 124, valve 136 is opened so that wash fluid is introduced into the filtration chamber at the wash-input pressure. To end the washing operation (the duration of which may be based, e.g., on elapsed time), valve 136 is closed and the filtering process resumes with the opening of valve 128, whereby fluid at elevated pressure is introduced into the filtration chamber, as has been previously described.

As evident from the method discussed above, the apparatus as illustrated in FIG. 1 is capable of a variety of operating sequences, based on the requirements of!a particular application. Alternatively, if the apparatus of FIG. 1 is to be used to perform only a specific task not requiring all the above-recited capabilities, its configuration may be simplified, as desired, by eliminating structural elements not necessary to perform a particular function. For example, if no need exists to produce a filter cake which is virtually liquid-free, the operation involving the application of fluid (e.g., compressed air) at conventional pressure to the contents of the filtration chamber may be omitted and the corresponding hardware (i.e., fluid source 130) may be eliminated.

The above-described method of using the filtration apparatus of FIG. 1 may be illustrated with a specific example of a modified starch slurry. The slurry is introduced into the filtration chamber at the slurry-input pressure of approximately 85 psi. The slurry flow is terminated when the back pressure in the chamber approaches 85 psi. Alternatively, the slurry flow may be shut off after about 14 seconds. Water is pumped into the filtration chamber as wash fluid at about 125 psi and the wash cycle continues for about 20 seconds. After the wash cycle has been completed, compressed air at the elevated pressure of about 200 psi is supplied into the filtration chamber from source 128 to force the wash liquid and the slurry liquids through the slurry solids. As the liquids begin to clear the slurry solids and the pressure inside the chamber begins to drop, valve 128 is closed, allowing the falling residual pressure in the inlet piping and the filtration chamber to continue forcing the liquids through the slurry solids. When the residual pressure drops to about 100 psi, the filtration chamber is pressurized with compressed air at the conventional pressure of about 100 psi for about 30 seconds to dry the resulting filter cake.

Another embodiment of the pressure-filter apparatus according to the present invention is described with reference to FIG. 2. In this configuration, fluid source 126 is arranged in series with a wash-fluid source 140 so that source 140 is located between source 126 and filtration chamber 120. A shut-off valve 142 is disposed between source 140 and inlet piping 109. The volume of the wash-fluid source 140 is from about 0.01 ft$^3$ to about 5 ft$^3$ per square foot of filter area. Thus, wash-fluid source 140 has a smaller volume than the corresponding wash-fluid source 134 illustrated in FIG. 1. Moreover, source 140 does not include a pump, but instead relies on the elevated pressure of the fluid in source 126 to push the wash fluid into the filtration chamber. Wash-fluid source 140 may contain liquids such as water, acid, caustic, or solvent.

Figure 2:
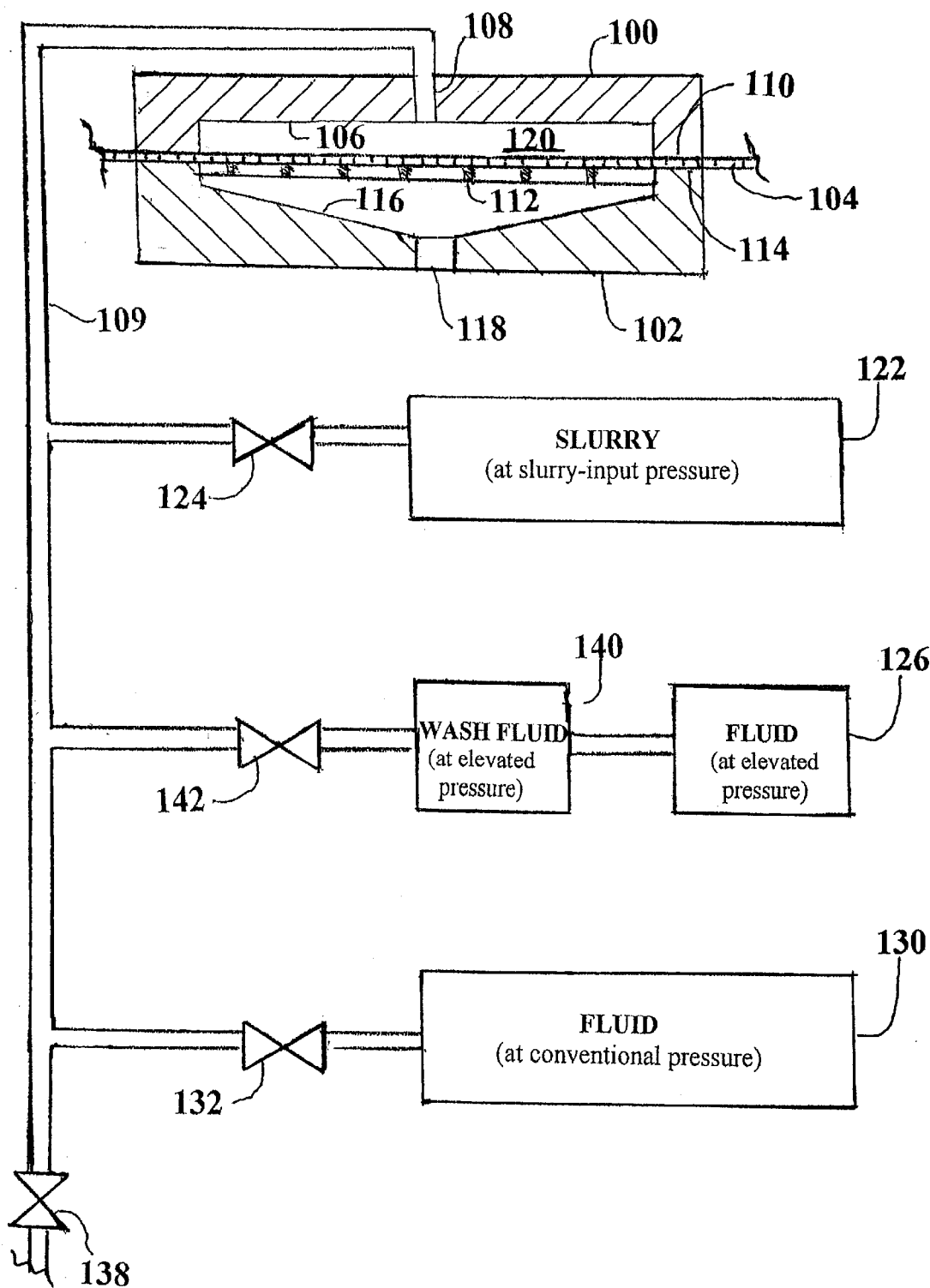
FIG. 2 is a schematic view of the pressure-filter apparatus according to another embodiment of the present invention.
Figure 3:
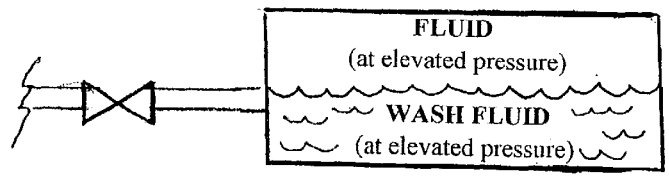
FIG. 3 is a schematic view of the pressure-filter apparatus according to yet another embodiment of the present invention.

Alternatively, wash-fluid source 140 and fluid source 126 of FIG. 2 may be integrated into a single unit such as a fluid source 144, illustrated in FIG. 3. Such a fluid source would include at least one pressure-supply apparatus (not shown), such as a compressor of a conventional type to produce the requisite elevated pressure. The volume of source 144 (FIG. 3) should be approximately the same as the combined volume of sources 126 and 140 (FIG. 2).

The method of operation of the above-described embodiment of the pressure-filter apparatus is discussed below with reference to FIG. 2. Initially, valve 124 is opened and a quantity of slurry at the slurry-input pressure is directed into filtration chamber 120 to be uniformly distributed therein. The inlet flow of slurry may be terminated based on elapsed time, back pressure inside the chamber, flow rate of slurry from source 122, or the weight of the contents of the filtration chamber, as previously discussed with reference to FIG. 1.

After the closing of valve 124, inlet piping 109 may optionally be drained of slurry using purge valve 138. Next, valve 142 is opened so that the entire volume of wash fluid (e.g., water) contained in fluid source 140 is introduced into the filtration chamber, propelled by the elevated pressure of the fluid (e.g., compressed air) in source 126. The elevated pressure of the fluid in source 126 proceeds to force the slurry- liquids and the wash liquid from the cake forming in the filtration chamber. Once the liquids begin to clear the solids, valve 142 is closed to allow the falling residual pressure in the inlet piping and filtration chamber 120 to continue driving the liquids through the slurry solids. The appropriate time to close valve 142 may be determined as discussed previously with reference to FIG. 1. The above sequence of operations results in a substantially-dry filter cake being produced in the filtration chamber and slurry liquids being collected in outlet cavity 116.

To produce a filter cake having an even lower liquid content, valve 132 may be opened for a specified time so that a fluid, such as compressed air, may enter the filtration chamber from sourced 132 at conventional pressure when the residual pressure in the filtration chamber drops sufficiently to be substantially equal to that conventional pressure.

The above-described method of using the filtration apparatus of FIG. 2 may be illustrated with a specific example which involves a molybdenum sulfide slurry with impurities dissolved in a cyanide slurry mother liquor. The slurry is introduced into the filtration chamber at the slurry-input pressure of approximately 90 psi. The slurry flow is terminated when the back pressure in the chamber approaches 90 psi. Alternatively, the slurry flow may be shut off after about 18 seconds. Next, valve 142 is opened so that a quantity of approximately 0.5 gallons of wash fluid (e.g., water) per square foot of filter area is introduced into the filtration chamber propelled by the elevated pressure (about 200 psi) of the fluid (e.g., compressed air) in fluid source 126. The elevated pressure of the fluid in source 126 acts to force the slurry liquids and the wash liquid from the cake forming in the filtration chamber. Once the liquids begin to clear the solids, valve 142 is closed to allow the falling residual pressure in the inlet piping and filtration chamber 120 to continue driving the liquids through the filtered solids. When the residual pressure drops to about 100 psi, the filtration chamber is pressurized with compressed air at the conventional pressure of about 100 psi for about 45 seconds to dry the resulting filter cake, if so desired.

Figure 4:
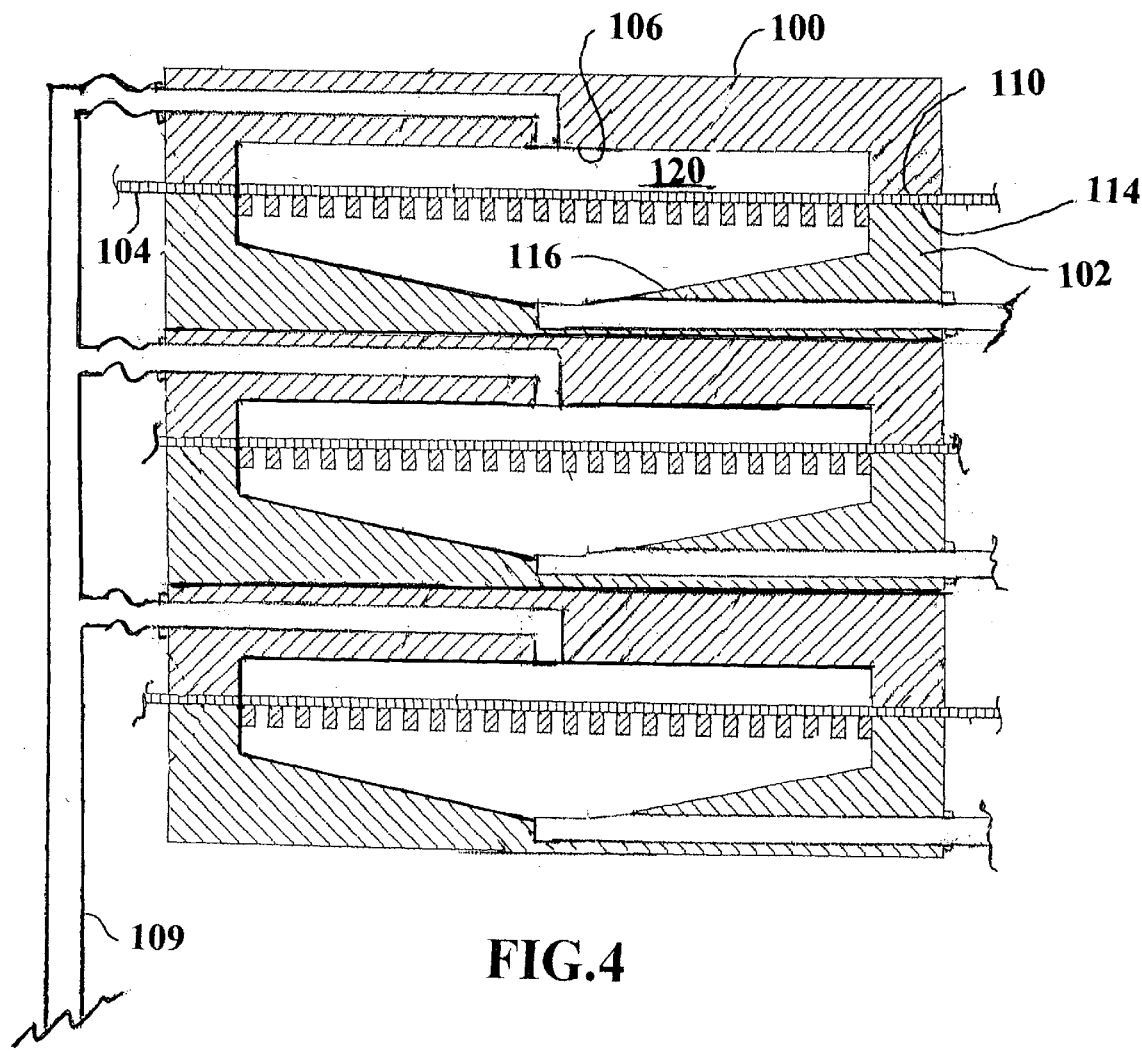
FIG. 4 is a schematic view of a multi-chamber pressure-filter apparatus.

The previously-described embodiments of the present invention may be implemented not only in a filter apparatus having a single filtration chamber, but also in an apparatus having a plurality of stacked shallow filtration chambers, as schematically represented in FIG. 4, each individual chamber being constructed substantially as has been described above. The necessary details regarding the basic configuration of such a multi-chamber filter apparatus are disclosed in U.S. Pat. Nos. 5,510,025 and 5,573,667 to the present inventor.

The above configurations of pressure-filter apparatus are given only as examples. Therefore, the scope of the invention should be determined not by the illustrations given, but by the appended claims and their equivalents.

What is claimed is:

1. A method of separating a quantity of slurry into slurry solids and slurry liquids comprising:

uniformly distributing said quantity of slurry in at least one filtration chamber;

forcing a first portion of said slurry liquids from said at least one filtration chamber with a first quantity of fluid at a pressure decreasing from an elevated pressure; and then forcing an additional portion of said slurry liquids from said at least on filtration chamber with a second quantity of fluid at a pressure decreasing from a conventional pressure after the pressure of said first quantity of fluid becomes substantially equal to said conventional pressure, said elevated pressure being higher than said conventional pressure.

2. The method of claim 1 wherein said first quantity of fluid and said second quantity of fluid comprise different fluids.

3. A method of separating a quantity of slurry into slurry solids and slurry liquids comprising:

uniformly distributing said quantity of slurry in at least one filtration chamber at a slurry-input pressure;

forcing a first portion of said slurry liquids from said at least one filtration chamber with a first quantity of fluid at a pressure decreasing from an elevated pressure; and then forcing an additional portion of said slurry liquids from said at least on filtration chamber with a second quantity of fluid at a pressure decreasing from a conventional pressure after the pressure of said first quantity of fluid becomes substantially equal to said conventional pressure, said elevated pressure being higher than said conventional pressure.

4. The method of claim 3 wherein said elevated pressure is at least as high as said slurry-input pressure.

5. The method of claim 4 wherein said conventional pressure is at least as high as said slurry-input pressure.

6. The method of claim 4 wherein said slurry-input pressure is at least as high as said conventional pressure.

7. The method of claim 4 wherein said first quantity of fluid and said second quantity of fluid comprise different fluids.

8. The method of claim 7 wherein said conventional pressure is at least as high as said slurry-input pressure.

9. The method of claim 7 wherein said slurry-input pressure is at least as high as said conventional pressure.

10. A method of separating a quantity of slurry into slurry solids and slurry liquids comprising:

uniformly distributing said quantity of slurry in at least one filtration chamber;

applying a quantity of wash fluid to said quantity of slurry;

forcing a first portion of said slurry liquids and wash fluids from said at least one filtration chamber with a first quantity of fluid at a pressure decreasing from an elevated pressure; and then forcing an additional portion of said slurry liquids and wash fluids from said at least on filtration chamber with a second quantity of fluid at a pressure decreasing from a conventional pressure after the pressure of said first quantity of fluid becomes substantially equal to said conventional pressure, said elevated pressure being higher than said conventional pressure.

11. The method of claim 10 wherein said first quantity of fluid and said second quantity of fluid comprise different fluids.

12. A method of separating a quantity of slurry into slurry solids and slurry liquids comprising:

uniformly distributing said quantity of slurry in at least one filtration chamber;

applying a quantity of wash fluid at a wash-input pressure to said quantity of slurry;

forcing a first portion of said slurry liquids and wash fluids from said at least one filtration chamber with a first quantity of fluid at a pressure decreasing from an elevated pressure; and then forcing an additional portion of said slurry liquids and wash fluids from said at least on filtration chamber with a second quantity of fluid at a pressure decreasing from a conventional pressure after the pressure of said first quantity of fluid becomes substantially equal to said conventional pressure, said elevated pressure being higher than said conventional pressure.

13. The method of claim 12 wherein said elevated pressure is at least as high as said wash-input pressure.

14. The method of claim 12 wherein said wash-input pressure is at least as high as said elevated pressure.

15. The method of claim 12 wherein said first quantity of fluid and said second quantity of fluid comprise different fluids.

* * * * *